United States Patent

[11] 3,547,450

[72] Inventor William R. Neilson
Clarendon Hills, Ill.

[21] Appl. No. 768,009
[22] Filed Oct. 16, 1968
[45] Patented Dec. 15, 1970
[73] Assignee Sherwood Electronic Laboratories, Inc.
Chicago, Ill.
a corporation of Illinois

[54] RECORD CHANGING APPARATUS
7 Claims, 9 Drawing Figs.

[52] U.S. Cl. .................... 274/10
[51] Int. Cl. .................... G11b 17/16
[50] Field of Search .................... 274/10S, 10SS, 10(Cursory)

[56] References Cited

UNITED STATES PATENTS

| | | | |
|---|---|---|---|
| 3,336,032 | 8/1967 | Hammond .................... | 274/105 |
| 3,361,428 | 1/1968 | Freier et al. .................... | 274/105 |
| 3,376,044 | 4/1968 | Freier .................... | 274/105 |

*Primary Examiner*—Leonard Forman
*Assistant Examiner*—Steven L. Stephan
*Attorney*—Wallenstein, Spangenberg, Hattis & Strampel ABSTRACT: A self-supporting record changer center spindle assembly which includes a hollow spindle body containing a plurality of upwardly and outwardly extending retractable supporting fingers for supporting one or more records above the rotating surface of a turntable. The supporting fingers extend through vertical slots in the spindle body and move in the slots downwardly from a normal record-supporting position to transport the lowermost record of a stack of records onto the rotating surface of the turntable. The upper portion of the spindle body is provided with a sleeve which has an expandable skirt which holds in place all records above the lowermost record when the lowermost record is being transported to the turntable. The sleeve is axially and rotatably adjustable on the spindle body for movement into a position to engage around the supporting fingers in a retracted position within the spindle body so a record can be manually positioned directly onto the turntable.

Inventor
William R. Neilson
By: Wallenstein, Spangenberg, Hattis & Strampel Attys.

Inventor
William R. Neilson
By: Wollenstein, Spangenberg, Hattis & Strampel Attys.

RECORD CHANGING APPARATUS

FIELD OF THE INVENTION AND PRIOR ART

This invention relates generally to improved center spindle assemblies for record changers, and more particularly to a unique construction of the upper storage portion of such spindle assemblies. Specifically, this invention is directed to a unique and novel construction which provides for both automatic and manual operation of record positioning onto a turntable.

The present invention here disclosed is described in connection with a record changer center spindle assembly of the self-supporting type whereby a stack of records to be played is supported on the upper storage portion of a spindle body without requiring an overlaying support arm which is used to stabilize the records on the spindle body. A self-supporting spindle assembly of this type includes a primary record-supporting means comprising a plurality of supporting fingers which normally project outwardly and upwardly through the upper portion of slots in the spindle body to support at least the uppermost record in a stack of records thereon and which are movable downwardly to carry the lowermost record of the stack to a turntable surface. A self-supporting spindle assembly of the foregoing type further includes supporting means in the region of the storage portion of the spindle for supporting the remainder of the records while the lowermost record is being transported to the turntable surface. This means may comprise an expandable sleeve just above the outwardly projecting supporting fingers which sleeve is normally urged into an upper inoperative position against the force of a spring pulling the same down. The sleeve is in a retracted position so it clears the center holes of the records surrounding the same. When the supporting fingers move down, the sleeve is allowed to drop into a position where the sleeve is cammed outwardly into tight engagement with the defining wall of the center hole of the record just above the record being lowered to the turntable surface, to support all remaining records in the stack.

Heretofore, automatic turntable self-supporting center spindle assemblies provided only for automatic lowering of records onto the turntable surface. If a user wished to place a record onto the turntable surface, the record first had to be placed on the upper storage portion and supported thereat while the user actuated a lever or button to energize the lowering mechanism to place the record onto the turntable surface. Therefore, self-supporting center spindle assemblies of the prior art do not enable a user to manually place a record directly upon the turntable surface.

OBJECTS AND SUMMARY OF THE INVENTION

Accordingly, one of the primary objects of the present invention is to provide a self-supporting center spindle of the type described hereinabove wherein records may be either stored at the upper storage portion of the spindle or placed manually directly onto the turntable surface.

Another object of the present invention is to provide a novel and simple design of a selecting device which provides for either automatic or manual placement of records onto a turntable surface.

Yet another object of the present invention, particularly from manufacturing and marketing standpoints, is to provide a selection device for self-supporting center spindle assemblies to enable either automatic or manual placement of records on a turntable surface and which is simple in construction, inexpensive to manufacture, and efficient and reliable in operation.

Briefly, in accordance with one aspect of the present invention, means carried on the spindle assembly is provided for retracting the supporting fingers within the spindle body while the fingers are in their upper record-supporting position so a record can be manually placed on the turntable. This means is most advantageously the aforesaid expandable sleeve modified to carry out the additional function. A rod extends upwardly from the center spindle body and through the sleeve and carries a noncircular or winglike head which normally fits into similarly shaped recesses in the top of the sleeve. A biasing spring is placed within the spindle body and normally urges the sleeve toward the head of the rod. The sleeve can be locked in a lowered position where it can surround and confine the supporting fingers pushed into their retracted positions in the spindle body by rotating the sleeve a quarter turn as it is moved down, to bring the uppermost edges of the sleeve on the opposite sides of the aforesaid recesses beneath the winglike head of said rod.

The above and other objects, features and advantages will be more fully realized and understood from the following detailed description when considered in conjunction with the accompanying drawings wherein like reference numerals throughout the various views of the drawings are intended to designate similar elements or components.

DESCRIPTION OF THE PREFERRED EMBODIMENT OF THE INVENTION

Figures 1, 2, 3, 4:
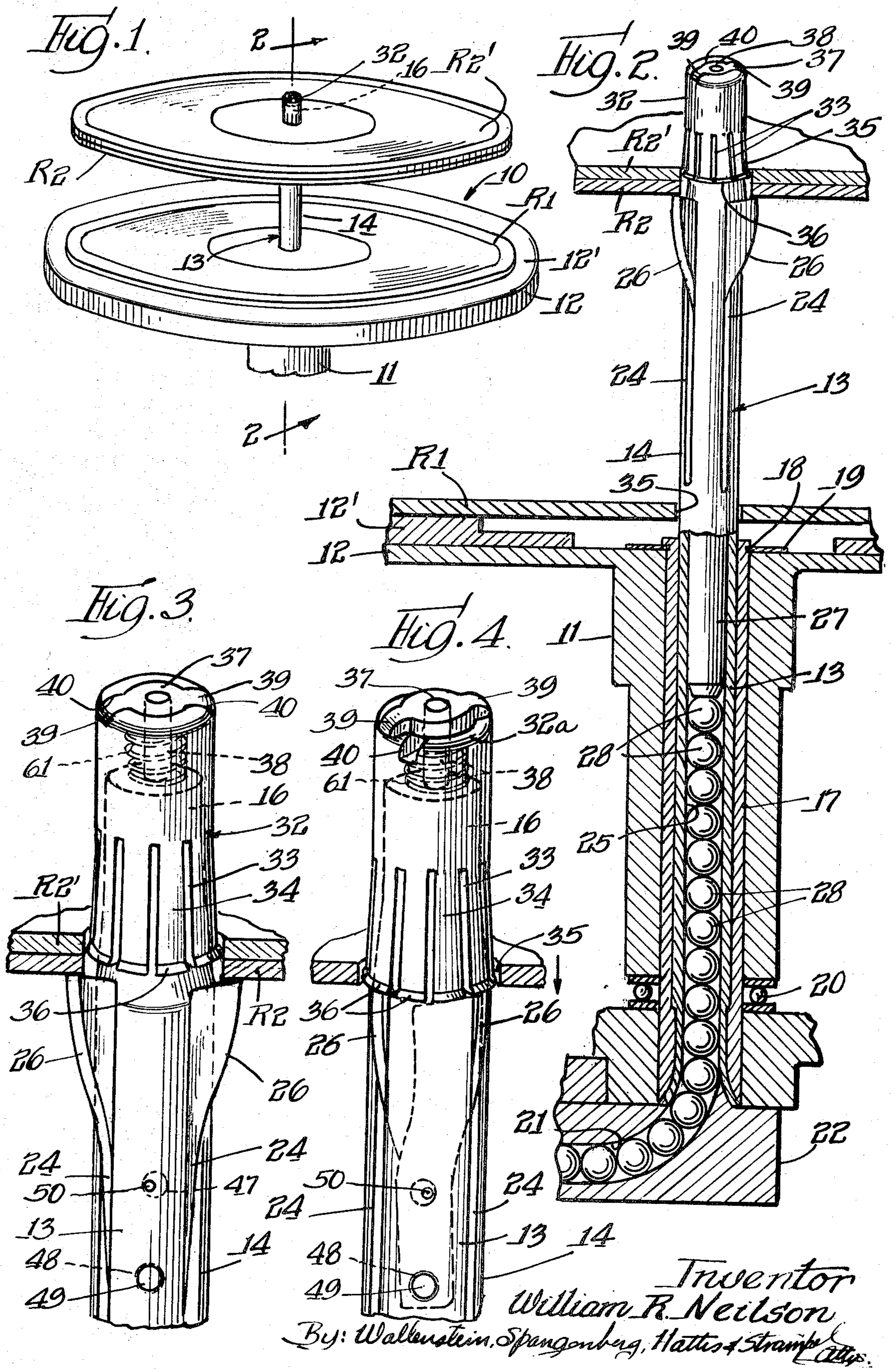
FIG. 1 is a perspective of a portion of an automatic turntable which utilizes the novel spindle assembly of this invention.
FIG. 2 is a partly perspective and partly fragmentary sectional view taken along the line 2–2 of FIG. 1, showing the spindle assembly in a normal record-supporting condition.
FIG. 3 is an enlarged broken away perspective view of the upper portion of the spindle assembly of FIG. 2 in the condition there shown.
FIG. 4 is an enlarged perspective view similar to that of FIG. 3 but showing the adjustable sleeve portion of the spindle assembly in a lowered position to enable manual placement of records on the turntable.

For a full understanding of my invention reference is now made to the drawings wherein FIG. 1 illustrates the record support and turntable portion of an automatic record player designated generally by reference 10. A turntable 12 is provided with a depending hollow hub 11 surrounding a stationary spindle body 13 and rotatably mounted on a ball bearing 20. Preferably, the hub 11 and turntable 12 is formed as a single casting. Suitable motor drive means (not shown) is provided to rotate the turntable 12 for the playing of disc records.

The center spindle body 13 forms part of a unique assembly with various parts to be described located within and on top of the spindle body. The spindle body 13 is hollow and extends above the turntable 12 to form a guide portion 14 and a storage portion 16. As seen in FIGS. 1 and 2, one record R1 is shown resting upon a resilient pad 12' on the surface of turntable 12 while other records R2, R2', etc. are shown in a stacked condition at the upper storage portion of the spindle body.

The bottom portion of the spindle body 13 has attached thereto an outer cylindrical member 17 terminating slightly above the turntable 12. An undercut portion 18 is formed at the end of the cylindrical member 17 which undercut portion receives a snap ring 19 holding the same around the spindle body 13. The cylindrical passageway 25 of the spindle body connects at the bottom thereof with a laterally extending passageway 21 in a base member 22. The latter passageways receive lowering means, such as balls 28.

The guide portion 14 of the spindle body 13 has a plurality of slots 24 through which supporting fingers 26 extend. The supporting fingers 26 are normally in an outwardly projecting position to underlie the record R2. The fingers 26 are pivotally mounted on a carrier assembly to be described which is connected to the upper end of a rod 27 movable within the spindle body 13. The bottom of the rod 27 rests on the balls 28 and moves upwardly and downwardly through the spindle body 13 with the movement of the balls 28 in the manner explained in U.S. Pat. No. 3,336,032. Downward movement of the rod 27 moves the guide fingers 26 downwardly to transport the lowermost record of the stack of records to the surface of the turntable 12.

Figures 5, 6, 7, 8, 9:
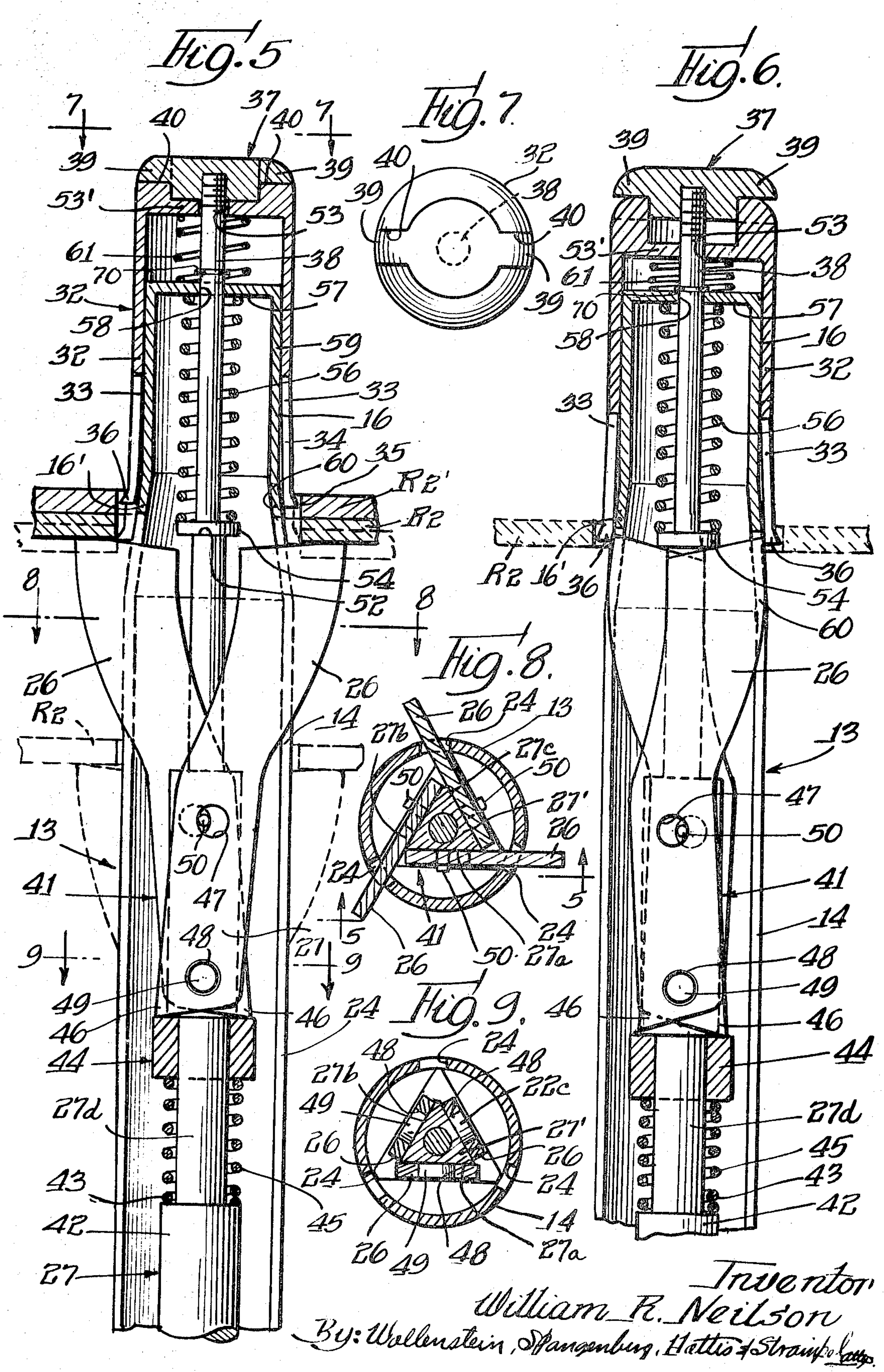
FIG. 5 is an enlarged partly elevational and partly sectional view of the upper portion of the spindle assembly in the condition shown in FIG. 3.
FIG. 6 is an enlarged partly elevational and partly sectional view of the upper portion of the spindle assembly in the condition shown in FIG. 4 to enable manual placement of records on the surface of the turntable.
FIG. 7 is a top view of the spindle of FIG. 5 taken along line 7–7.
FIG. 8 is a sectional view of the spindle of FIG. 5 taken along line 8–8.
FIG. 9 is a sectional view of the spindle of FIG. 5 taken along line 9–9.

An expandable sleeve 32 surrounds the support portion 16 of the spindle body 13 which is of reduced size. The guide portion 14 of the spindle body joins the support portion thereof through a curved cam-forming section 16' (FIG. 5). A plurality of slots 33 are formed in the bottom of the sleeve 32 thereby defining a plurality of expandable resilient downwardly extending gripping fingers 34. A gripping edge 36 is formed on the end of each of the fingers 34 which is normally in a retracted position where it clears the peripheral surface of the record center hole 35. In a manner to be described, when the bottommost record R2 is lowered into position on the turntable 12, the sleeve 32 is pulled down so the gripping fingers 34 surround and engage the camming surface 16' to expand the fingers 34 into engagement with the peripheral surface of the center hole 35 of the record R2' above the lowermost record R2 being lowered upon the turntable, to support the entire stack of records above the same.

Reference should now be made to FIGS. 5, 6, and 8 which best show the construction of the finger carrier assembly located within the spindle body 13 and designated generally by reference numeral 41. The finger carrier assembly 41 includes an enlarged portion 27' of the rod 27 which portion 27' has a triangular cross section providing three vertical surfaces *27a*, *27b* and *27c* facing in direction 120° apart. The supporting fingers 26 have apertures 48, the defining walls of which are pivotally mounted about pins 49 extending from the vertical surfaces *27a*, *27b* and *27c*. The rod 27 has a reduced portion *27d* around which is slidably mounted a movable head 44. A compression spring 45 is positioned between the movable head 44 and a shoulder 43 to urge the head 44 upwardly against the lower corner portions 46 of the supporting fingers 26. As best seen in FIG. 5, the upward force of the head 44 against the lower corner portion 46 causes the fingers 26 to be biased so as to extend outwardly through the slots 24 in the guide portion 14 or the spindle body 13.

Each of the supporting fingers 26 has an aperture 47 which surrounds a smaller pin 50 extending from the associated vertical surface *27a*, *27b* or *27c* of the rod portion 27'. The apertures 47 and pins 50 serve as limit stop means to limit the inward and outward movement of the supporting fingers 26 within the slots 24.

The rod 27 extends above the finger carrier assembly 41 and terminates adjacent the bottom of the reduced support portion 16 of the spindle body 13. The top 52 of the rod 27 is engaged by the flanged portion 54 on the bottom of a pin 38 urged against the rod by a coil spring 56 compressed between the end wall 57 of the spindle body and the flanged portion 54 of the pin 38. The pin 38 extends upward through an opening 58 in the end wall 57 of the spindle body 13 and an opening 53 in an internal end wall 53' near the top of the sleeve 32. The upper end of the pin 38 is threaded to receive a nut 37 which fits within a recessed portion in the top of the sleeve 32 and, under the force of the spring 56, bears down on the sleeve 32 to urge the sleeve downwardly when the rod 27 is lowered from its uppermost position shown in FIG. 5 at the beginning of a record-changing operation. The sleeve 32 is thereby pulled down over the cam-forming portion 16' of the spindle body to expand the sleeve fingers 34 into tight engagement with the peripheral inner surface of the record hole 35 of the record R2' above the record R2 directly underlied by the supporting fingers 26.

According to the preferred form of my invention, the sleeve 32 is adjustably mounted in a manner to act, in addition to a means for supporting records during a record-changing operation, as a means for holding the supporting fingers 26 in a retracted position in the spindle body, to enable the manual placement of a record on the surface of the turntable 12. To this end, the sleeve is designed to be manually adjustable to a lowered position where it surrounds the fingers 26 (FIG. 6). This is accomplished preferably by providing the nut 37 with a noncircular or wing-shaped head seating in complementary recesses in the sleeve 32. The nut 37 thus includes a pair of winglike extensions 39–39 which are directed radially outwardly of the center portion of the nut. Formed in the top surface of the sleeve 32 are conformably-shaped nut recesses 40–40 which normally fit over the winglike portions 39–39 so the sleeve is in an inoperative upper position as best shown in FIGS. 3 and 5.

The sleeve 32 is freely mounted for axial and rotatable motion on the upper portion of the center spindle body 13 and is urged against the bottom surface of the nut 37 by biasing means 61, preferably in the form of a coil spring surrounding the pin 38 and compressed between the end wall 57 of the spindle body 13 and the sleeve end wall 53'. The sleeve 32 is lowered into the positions where it can surround and confine the supporting fingers 26 manually held in their retracted positions within the spindle body with one hand by moving the sleeve axially downward with the other hand and rotating the same about a quarter turn so the upper edges of the sleeve 32 on the opposite sides 39–the sleeve recesses 40 underlie the winglike extensions 39–39 of the nut. When the sleeve is released, the coil spring 61 will hold the sleeve 32 in this lower position where it holds the fingers 26 in their retracted positions. A clip ring 70 fits in a groove formed in the pin 38 and is spaced from the end wall 57 to limit downward axial movement of the pin 38.

Accordingly, the detailed description as set forth hereinabove together with the accompanying drawings clearly teaches the construction of a spindle assembly for automatic record changers utilizing the principles of my invention. Although a single embodiment has been disclosed, it will be understood that variations and modifications may be effected without departing from the spirit and scope of the novel concepts of this invention.

I claim:

1. In a self-supporting record changer center spindle assembly of the type having a plurality of retractable record supporting fingers which normally project outwardly through vertical slots in a spindle body to underlie and support at least the lowest record in a stack of disc records with spindle body-receiving holes at the center thereof around an upper storage portion of the spindle body, said supporting fingers being movable downwardly from a normal upper position to a lower position where the lowermost record of the stack of records is delivered to a turntable for playing and the fingers retract within the spindle body, the retracted fingers being then movable upwardly through the spindle body-receiving holes of the records on the turntable to their initially upper outwardly projecting positions, the improvement therein comprising, manually adjustable means connected to said spindle assembly for adjustment between a first stable inoperative position where said supporting fingers in said upper position are in said outwardly projecting position and a stable operative position where said supporting fingers are retracted in said upper position within said spindle body so a record surrounding said spindle body will freely pass over the said retracted supporting fingers for manual placement on said turntable said manually adjustable means being a sleeve of smaller size than the spindle body-receiving hole of a record which sleeve is axially adjustable on said spindle body and in said operative position surrounds and holds said supporting fingers in a retracted position within said spindle body.

2. A self-supporting record changer center spindle assembly according to claim 1 wherein said manually adjustable means is rotatably as well as axially adjustable on the said spindle body, said sleeve being rotatable into a stable position when axially moved into said operative position to hold the sleeve in said operative position.

3. A self-supporting record changer center spindle assembly according to claim 1 wherein said sleeve is positioned at the upper end of said spindle assembly, said operative position of said sleeve is a position where it is lowered into a position around said retracted supporting fingers.

4. The record changer spindle assembly of claim 3 wherein said sleeve has a portion which expands into tight engagement with the defining walls of the spindle body-receiving hole of the record above the lowermost record when the lowermost record is being lowered to the turntable by the lowering of the said supporting fingers.

5. A self-supporting record changer center spindle assembly according to claim 4 including biasing means for urging said sleeve upwardly relative to said supporting fingers, locking means cooperating with said biasing means for holding said sleeve in a downward operative position against the force of said biasing means to maintain said sleeve around said retracted supporting fingers when records are to be manually placed directly upon said turntable.

6. A self-supporting record changer center spindle according to claim 5 wherein said sleeve includes a radially inwardly extending wall portion which is located on said sleeve a distance above the top end of said spindle body, and wherein said biasing means is a coil spring positioned between the top end of said spindle body and said wall portion.

7. A self-supporting record changer center spindle according to claim 5 wherein said sleeve has recesses at the top thereof, said locking means including a rod extending upwardly from said spindle body through said sleeve, said rod having a noncircular head formed at the upper end thereof which normally fits into said recesses on said sleeve to hold said sleeve in the first stable inoperative position, whereby a downward turning motion of said sleeve will cause said head to be underlied by raised portions of said sleeve adjacent the recesses to hold said sleeve in a lowered position to maintain the supporting fingers in their retracted positions.